United States Patent [19]

Schauer et al.

[11] Patent Number: 4,696,523
[45] Date of Patent: Sep. 29, 1987

[54] DEVICE FOR TRANSFERRING CURRENT BETWEEN TWO CONTACT POINTS WHICH ARE MOVABLE RELATIVE TO EACH OTHER

[75] Inventors: Friedrich Schauer, Heroldsberg; Hans Berthold, Eckenthal-Brand, both of Fed. Rep. of Germany

[73] Assignee: Kabelmetal Electro Gesellschaft mit beschränkter Haftung, Hanover, Fed. Rep. of Germany

[21] Appl. No.: 907,872

[22] Filed: Sep. 16, 1986

[30] Foreign Application Priority Data

Nov. 22, 1985 [DE] Fed. Rep. of Germany ....... 3541287

[51] Int. Cl.⁴ ............................................ H01R 39/00
[52] U.S. Cl. ...................................... 439/11; 439/445
[58] Field of Search .................................. 339/10, 1–3, 339/5, 6, 8, 119 C, 147 C, 163, 101, 17 F, 176 MF

[56] References Cited

U.S. PATENT DOCUMENTS

| | | | |
|---|---|---|---|
| 3,426,308 | 2/1969 | Anderson et al. | 339/5 P |
| 3,599,165 | 8/1971 | Wendell | 339/5 M |
| 3,707,696 | 12/1972 | Carter | 339/103 M |
| 4,548,460 | 10/1985 | Dozsa et al. | 339/107 |

FOREIGN PATENT DOCUMENTS 2519222  7/1983  France .................. 339/101

OTHER PUBLICATIONS

"Connector-Shielded Cable", B. Dessauer, R. D. McNutt, (Mar. 1967), vol. 9, #10, p. 1298 (IBM Tech. Discl. Bulletin).

Primary Examiner—Gil Weidenfeld
Assistant Examiner—David Pirlot
Attorney, Agent, or Firm—Martin A. Farber

[57] ABSTRACT

A device is described for transferring current between two contact points (6, 8) which are movable with respect to each other without the use of a sliding contact. A ribbon cable (10) wound in the manner of a spring housing is connected between the two contact points (6, 8). To protect the ribbon cable (10) from kinking, a guide (11) is arranged at each of the two contact points (6, 8), the guides closely surrounding the ribbon cable (10). The guide (11) is long in proportion to its width.

10 Claims, 6 Drawing Figures

U.S. Patent      Sep. 29, 1987      4,696,523

DEVICE FOR TRANSFERRING CURRENT BETWEEN TWO CONTACT POINTS WHICH ARE MOVABLE RELATIVE TO EACH OTHER

FIELD AND BACKGROUND OF THE INVENTION

The present invention refers to a device for transferring current between two contact points between which there is arranged a ribbon cable serving for the electrical connection which has at least two electric conductors and is wound in the manner of a spring with its turns lying concentric to each other, its ends being firmly attached to the two contact points and at least one of the two contact points being movable relative to the other on a path concentric to the turns of the ribbon cable.

Apparatus having such devices include, for instance, cable coilers in which the electric cable or cord is wound on a reel. The cord can be pulled out of the housing of the apparatus. Under the action of a spring it is automatically rolled up again after a pulling force is removed. One essential problem here is the transfer of current from the firm attachment of the apparatus to the end of the line which is arranged turnably on the spool. This problem occurs in all apparatus in which there are two contact points which are movable relative to each other and one of which in most cases is developed as a fixed point. In addition to the above-mentioned cable winder, such an apparatus may also be an anti-rebound device for automative vehicles in which the electric current feed is arranged in the steering wheel of a car.

For the transfer of current between contact points which move relative to each other, wiper contacts or rings have been known for a long time. Such arrangements are subject to wear and are disadvantageous particularly in the case of low current intensities because of the high transfer resistances. From Federal Republic of Germany Utility Model No. 78 11 922 a cable winder is known in which a ribbon cable wound in the manner of a spring is used for the transfer of the current. A similar arrangement can be noted for the transfer of current for an anti-rebound device for automotive vehicles from Federal Republic of Germany Utility Mocdel No. 85 05 830. Upon relative rotation of the two contact points which are connected by the ribbon cable the ribbon cable which has been wound up "breathes" like the spring of a clock. The turns are pulled together to a small diameter in the one direction of rotation. In the other direction of rotation they go back to a larger diameter. Upon this movement, the points of connection of the ribbon cable at the two contact points are subjected to considerable mechanical stress, particularly in flexure. However, there is also the danger that upon the rotation the ribbon conductor will be pushed in the direction of the cable past a contact place as a result of its own stiffness and will then be kinked. In both cases, an interruption in the feeding of the current may be the result. Furthermore, there is the danger that the ribbon cable will jam and the rotation of the contact point can then no longer take place.

SUMMARY OF THE INVENTION

It is an object of the invention to provide a device having two contact points which are connected by a wound ribbon cable in which the connections between the ribbon cable and the contact points are protected against bending, and kinking of the ribbon cable is excluded.

According to the invention there is provided with a device of the aforementioned type:

at each contact point (6, 8) a strip-shaped stabilizer (11) of dimensionally stable plastic of U-shaped cross section which is bent in accordance with the radius of curvature of the ribbon cable (10), said stabilizer being at least as wide as the ribbon cable (10) and closely surrounding the ribbon cable (10), which is connected to the corresponding contact point (6, 8), on both flat sides and one narrow side of said ribbon cable; and the stabilizer (11) is long in proportion to its width.

The stabilizers are fastened to the two contact points by, for instance, welding or bonding. They surround the ends of the flat ribbon cable which are connected to the contact points and guide said cable over a relatively large length. The places of attachment of the ribbon cable to the contact points are thereby protected from bending and the lengthy guidance of the cable by the curved stabilizers prevents the cable from being pushed past the contact points in the direction of the cable upon the rotating of the device. The ribbon cable is thereby dependably protected against kinking.

Further features of the invention are as follows.

The ribbon cable (10) is provided with flat conductors (12) of rectangular cross section.

Still further, projections (13) are arranged on the inner surfaces of the U-shaped stabilizer (11) in a region which extends beyond the ribbon cable (10) after the introduction therein.

Yet further, the two arms (15, 16) of the stabilizer (11) extend obliquely to each other in their condition of rest, namely without the ribbon cable (10) introduced, so that they contact each other.

Also the ribbon cable (10) has passage holes in the regions thereof which are enclosed by the stabilizer (11).

Further, the two arms (15, 16) of the stabilizer (11) are welded to each other through the passage holes by ultrasonics.

Still further, the ribbon cable (10) is welded by the action of ultrasonics to the two arms (15, 16) of the stabilizer (11).

Yet further, the stabilizer (11) is welded to the contact points (6, 8).

Further, the stabilizer (11) is bonded to the contact points (6, 8).

BRIEF DESCRIPTION OF THE DRAWING

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
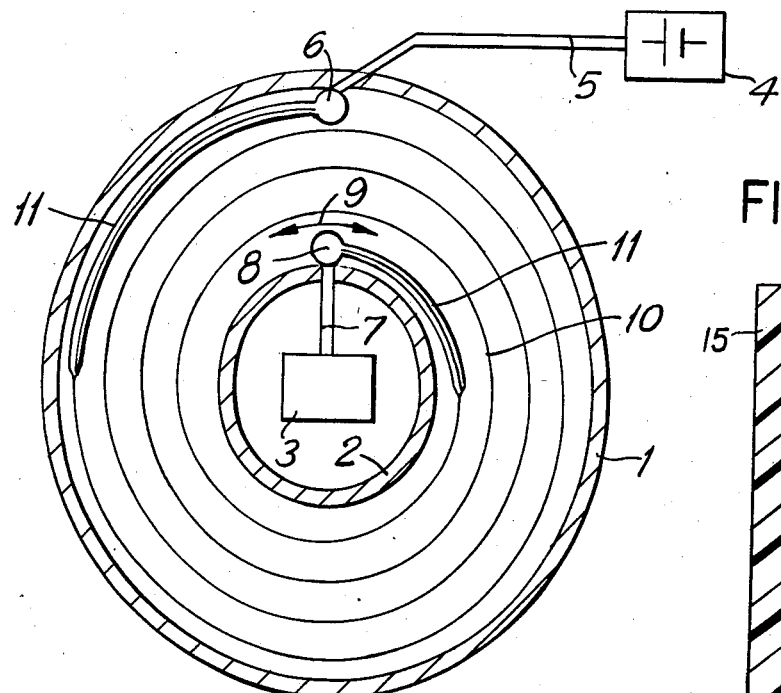
FIG. 1 is a diagrammatic cross section through an apparatus having a device in accordance with the invention.

FIG. 1 diagrammatically shows two, for instance, circular walls 1 and 2 of the housing of an electric apparatus. This apparatus can, for instance, be a control apparatus for the anti-rebound protection of automotive vehicles. It can be installed in the steering shaft of a car. In order to provide current to the electronic system 3 of this apparatus, the apparatus is connected to the battery 4 of the car. The battery 4 is connected via an electric cable 5 to a contact point 6, developed as fixed point. The electronic system 3 is connected by an electric line 7 to a contact point 8 which is movable in the direction indicated by the double-ended arrow 9. Between the two contact points 6 and 8 there is a ribbon cable 10 which, for purposes of simplicity, will be referred to hereinbelow as "RC 10."

Between the two contact points 6 and 8, the RC 10 is wound in several turns, namely in the manner of the spring of clocks. Although the number of revolutions of a steering wheel is limited to about six revolutions, substantially more than six turns should be provided for the RC 10. The rotation of the contact point 8 is then not substantially perceptible by an individual turn of the RC 10. The diameter of the package consisting of all turns of the RC 10 is merely reduced or increased.

At both contact places 6 and 8, the RC 10 is surrounded by a strip-shaped stabilizer 11 of dimensionally stable plastic, such as, for instance, polystyrene or polyamide. The stabilizer 11 is bent in accordance with the curvature of the RC 10 and fastened to the corresponding contact points 6 and 8. The fastening can be effected, for instance, by welding or bonding. In principle, a clamping or snap engagement is also possible.

Figure 3:
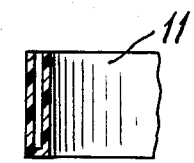
FIG. 3 is a broken away cross section at Z of FIG. 2.
Figure 4:
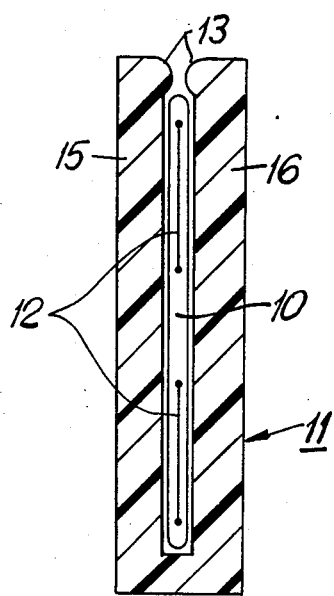
FIG. 4 is a cross section of the stabilizer in an even larger showing.

The stabilizer 11 has a U-shaped cross section, as can be noted in principle from FIG. 4. It is at least as wide as the RC 10 so that it surrounds the latter on both flat sides and on one narrow side. The stabilizer is long in proportion to its width so that the RC 10 is guided over a relatively long length. The length of the stabilizer 11 is, for instance, ten times as great as its width. The width of the RC 10 can be noted from the cross-section Z at FIG. 3.

For good flexibility, the RC 10 is advisedly provided with flat, rectangular conductors 12, as shown in FIG. 4. It then constitutes a flat-conductor ribbon conductor.

The stabilizer 11 can also be wider than the RC 10 so that it extends beyond the latter. At those places projections 13 can be arranged on its inner surface, they serving to prevent the sliding of the RC 10 out of the stabilizer 11.

Figure 6:
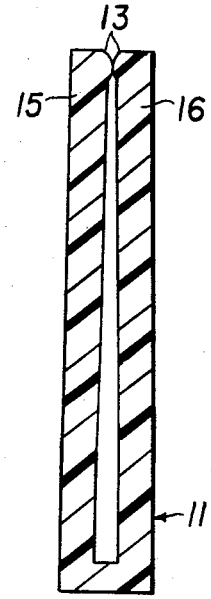
FIG. 6 is a cross section of a modified embodiment of FIG. 4 showing the arms of the stabilizer contacting each other.
Figure 2:
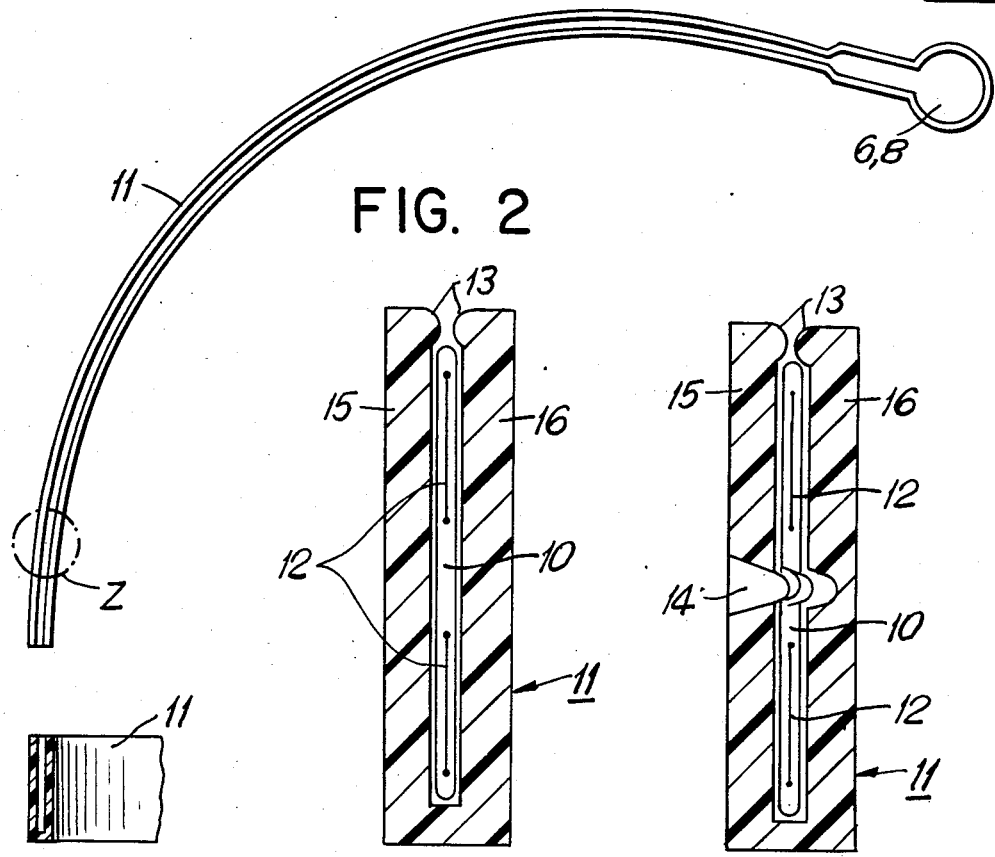
FIG. 2 is a side view of a stabilizer inserted in the apparatus, shown on a larger scale.

The stabilizer 11 can also be developed in such a manner that the RC 10 is clamped in position. The two flat sides of the stabilizer 11 can in such case extend obliquely to one another in its position of rest, i.e. without RC 10, so that they contact each other (FIG. 6). They must be bent apart in order to introduce the RC 10 and then lie firmly against the RC 10.

For the further securing of the RC 10 in the stabilizer 11, the RC 10 can be provided with passage holes in each of the regions thereof which is surrounded by a stabilizer 11, namely at its ends. By the use of ultrasonics the two flat sides of the stabilizer 11 can be welded to each other through these passage holes.

Figure 5:
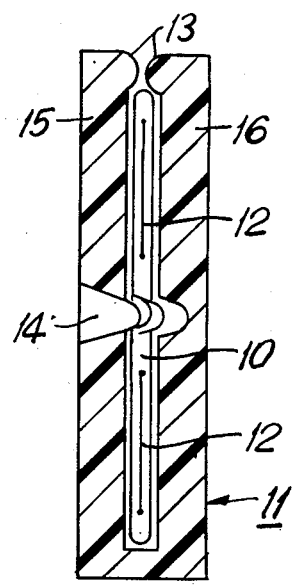
FIG. 5 is a cross section of a modified embodiment as compared with FIG. 4.

The additional attachment by the use of ultrasonics can also be produced without passage holes in the RC 10. As shown in FIG. 5, the ultrasonic welding can be effected, at the place 14 between the wires 12 of the RC 10. The material of the arm 15 of the stabilizer 11 then penetrates into the RC 10. The RC 10 is thereby bulged outward and, on its part, penetrates into the arm 16 of the stabilizer 11.

The invention has been described above with reference to the supplying of current for the anti-rebound protection of automotive vehicles. However, it can be used, in principle, in all electric apparatus in which sliding contacts are not to be used for the transfer of current between two contact points which are movable relative to each other. Another field of use is, for instance, that of cable coiler. In most cases one of the contact points is developed as fixed point while the other is movable. However, the invention can also be used when both contact points are movable. The path which the one contact point can then move over must, to be sure, be narrowly limited.

We claim:

1. In a device for transferring electric current between two contact points connected by a ribbon cable serving for the electrical connection, the cable having at least two electric conductors and being wound in the manner of a spring with its turns lying concentric to each other, and wherein ends of the cable are firmly attached to the two contact points, and at least one of the two contact points is movable relative to the other on a path concentric to the turns of the ribbon cable, the improvement comprising a strip-shaped stabilizer of dimensionally stable plastic and having a U-shaped cross section which is bent to follow a radius of curvature of the ribbon cable, said stabilizer being at least as wide as the ribbon cable and closely enclosing the ribbon cable on opposite flat sides and one narrow side of said ribbon cable, and wherein said stabilizer, in cross-sectional dimensions, is long relative to its width.

2. The device as set forth in claim 1, wherein
said ribbon cable is provided with flat conductors of rectangular cross section.

3. The device as set forth in claim 1, wherein said stabilizer includes
projections arranged on inner surfaces of the stabilizer along edge regions of the stabilizer which extend beyond said ribbon cable after introduction of the cable into the stabilizer.

4. The device as set forth in claim 1, wherein
said stabilizer has two arms, and the two arms of the stabilizer extend obliquely to each other in their condition of rest prior to introduction of said ribbon cable into said stabilizer so that said arms contact each other.

5. The device as set forth in claim 1, wherein
the stabilizer is welded to the contact points.

6. The device as set forth in claim 1, wherein
the ribbon cable has through-holes in regions thereof which are enclosed by the stabilizer.

7. The device as set forth in claim 6, wherein
said stabilizer has two arms, and the two arms of the stabilizer are ultrasonically welded to each other via the through-holes.

8. The device as set forth in claim 7, wherein
the ribbon cable is welded by the action of ultrasonics to the two arms of the stabilizer.

9. The device as set forth in claim 1, wherein
the stabilizer is bonded to the contact points.

10. The device as set forth in claim 2, wherein said stabilizer includes
projections arranged on inner surfaces of the stabilizer along edge regions of the stabilizer which extend beyond said ribbon cable after introduction of the cable into the stabilizer.

* * * * *